June 8, 1937.　　R. C. NEWHOUSE ET AL　　2,083,344
SYSTEM AND METHOD OF DETERMINING DISTANCES
Filed April 6, 1934
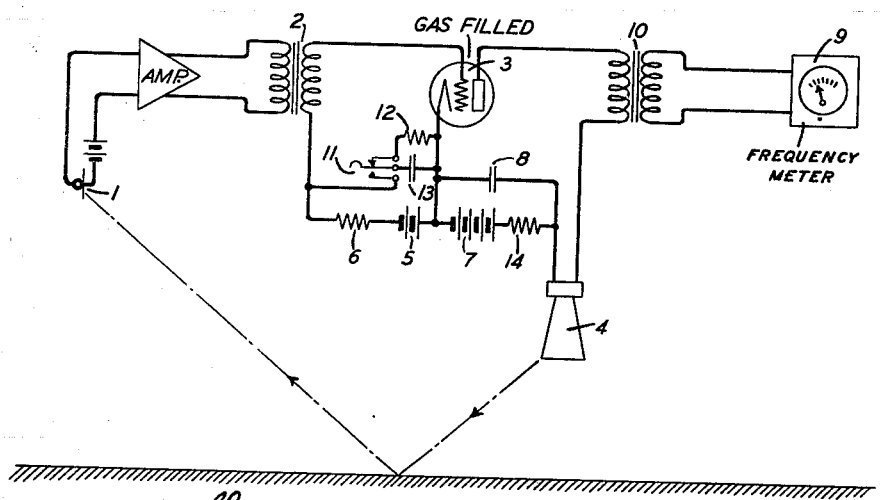
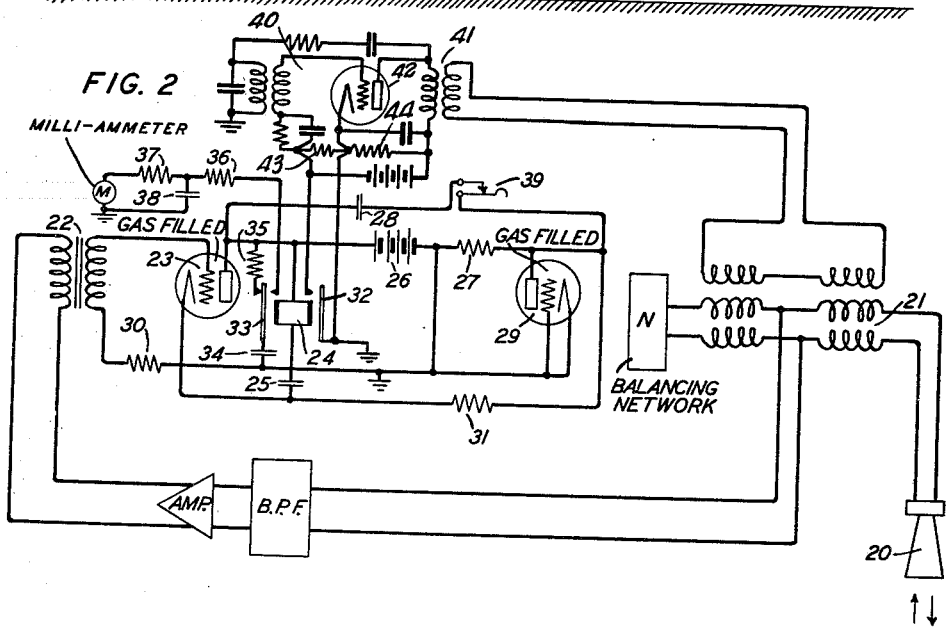
INVENTORS: R. C. NEWHOUSE
W. C. TINUS
BY E. V. Griggs
ATTORNEY Patented June 8, 1937

2,083,344

UNITED STATES PATENT OFFICE 2,083,344

SYSTEM AND METHOD OF DETERMINING DISTANCES

Russell C. Newhouse, New York, N. Y., and William C. Tinus, Orange, N. J., assignors to Bell Telephone Laboratories, Incorporated, New York, N. Y., a corporation of New York Application April 6, 1934, Serial No. 719,260

12 Claims. (Cl. 177—352)

This invention relates to the determination of distances by means of longitudinal waves and more particularly to a means and method of establishing the altitude of an airplane.

An object of this invention is to ascertain distances.

Another object of this invention is to measure relatively short distances accurately and precisely.

A more particular object of this invention is to aid a pilot in flight in the estimation of the altitude of his airplane.

One of the hazards of aeronautics that has commanded especial consideration in recent years is the difficulty incident to the landing of an airplane in foggy weather. To cope with this situation, many devices have heretofore been proposed for facilitating the safe landing of airplanes when atmospheric visibility has been poor.

It has long been known that distances may be ascertained by the production of sonic waves and the determination of the period required for these waves to travel to and return from a reflecting surface. Since the time which elapses between the emission of the sonic waves and their reception after reflection is directly correlated with the distance between the source of the waves and the reflecting surface, long distances may be easily estimated. However, due to the short interval between the emission of sonic waves and their reception after reflection, relatively short distances are difficult of ascertainment.

In accordance with this invention, longitudinal vibrations which produce waves, such as sonic or supersonic waves, in a molecular medium are employed to measure relatively short distances. When the distance between two points is desired and a homogeneous medium, such as air, separates them, the sonic or supersonic waves are emitted from a source located at one of the points. At the other point, these waves after passing through the medium are received by a receptive device. This receptive device actuates the source for the transmission of another wave or train of waves. The receptive device and the source are connected for this actuation by a line or by means of radio apparatus. The number of times that the source emits a wave or trains of waves is recorded by an indicating means. Since the number of times that the waves are emitted over any period of time is dependent upon the distance and the velocity of the waves through the molecular medium and since the velocity of the waves through the medium is usually known, the distance is calculated or recorded directly on the indicating means.

Alternately, when the distance between a point in one molecular medium to the bounding surface of another medium is desired, the source of longitudinal waves and the receptive device are located at the point. The waves produced by the source travel through the medium in which the point is located and are reflected back by the bounding surface to the receptive device. For example, the height of an airplane above the ground is ascertained by transmitting a train of waves from a source on the airplane. This train of waves after passing through the air is reflected by the bounding surface or ground. The reflected wave is received by a receptive device on the airplane. The receptive device in turn actuates the emission of another train of waves. An indicator on the airplane records the number of times that the source emits a train of waves. By determining the rate at which the source is actuated during a predetermined period of time, the height of the airplane above the ground is ascertained. The rate increases as the airplane approaches the ground. This feature of the system is a decided advantage in that great accuracy is obtained in the measurement of short distances.

A more comprehensive understanding of this invention is obtained by reference to the accompanying drawing in which Fig. 1 represents a schematic of the apparatus employed in a simple embodiment of this invention; and Fig. 2 is a schematic of this invention especially adaptable for use on airplanes.

In Fig. 1, I represents a microphone or other means which is responsive to sonic or supersonic waves. The surge produced by the reception of the sonic wave is amplified in magnitude by the amplifier AMP and passes through a transformer 2 to the input circuit of the space discharge device 3. The characteristics of the device 3 are such that when the control electrode of the device is more negative than a certain critical value depending upon the particular device and anode voltage employed, the anode-cathode path is effectively an open circuit. When the potential of the control electrode becomes less negative than this value, the anode-cathode impedance becomes extremely low and remains at that low value regardless of changes in the potential of the control electrode until the anode voltage has fallen to a value insufficient to maintain the current through the device. The control electrode regains control of the device at this instant and the anode circuit remains practically an open circuit as long as the control electrode potential is maintained more negative than its critical value. The gaseous space discharge device known commercially as the trigger tube or Thyratron possesses these characteristics.

A sonic or supersonic wave transmitter 4 is connected in series with the output circuit of the device 3. The battery 5 provides a normal biasing potential through the resistance 6 to the control electrode of the device 3. A unidirectional source 7 supplies the anode of the device 3 with current through a resistance 14. Bridged across the battery 7 and the resistance 14 is a condenser 8. The values of condenser 8 and resistance 14 are chosen so that their time constant is slightly less than the time interval corresponding to the smallest distance to be measured.

A frequency meter 9, such as the reed type or the type hereinafter described and employed in the circuit shown in Fig. 2, or other means of measuring the number of times that the surge of current passes through the anode circuit, is connected to the secondary of a transformer 10. The primary of the transformer 10 is connected in series with the output circuit of device 3.

A path including a key 11 and a condenser 13 is connected across the battery 5 and resistance 6. The back contact of the key is connected through a resistance 12 to the cathode of device 3. The condenser 13 is at one terminal connected to the key 11 and at the other terminal to the cathode of the device 3. The key is normally biased for the engagement of the back contact with the key. A depression of the key 11 connects the condenser 13 across the battery 5 and resistance 6. The charging current from the condenser 13 flowing through the resistance 6 produces a difference of potential thereacross which diminishes the negative potential of the terminal of resistance 6 to which the control electrode is connected. This action results in sufficient reduction of the normal negative bias from the control electrode during the interval in which the condenser 13 is charging to operate the device 3. Typical values for the elements of the circuit shown in Fig. 1 which have been found to be satisfactory are as follows: resistance 6—10,000 ohms; resistance 12—10,000 ohms; resistances 14—100,000 ohms; condenser 13—.1 microfarad; condenser 8—.1 microfarad; battery 5—6 volts; unidirectional source 7—180 volts. The device 3 may be an argon filled discharge device designated as number 256A and manufactured by the Western Electric Company. The condenser 8 and the resistance 14 are fundamentally the critical elements of the circuit shown in Fig. 1 and determine the minimum altitude which can be measured.

When the distance between two points separated by a homogeneous molecular medium is desired, the microphone 1 is positioned at one point, while the transmitter 4 is located at the other point. The key 11 is momentarily depressed. As a result the normal negative bias of the control electrode is reduced below its critical value and the anode-cathode impedance of the device is reduced to an extremely low magnitude. Condenser 8 is discharged through transmitter 4 and transformer 10 causing the emission of sonic or supersonic waves from the transmitter 4 and the reception of an impulse by the frequency meter 9. The transmitter 4 emits either an impulse or train of waves depending upon the mechanical characteristic of the transmitter. If the transmitter is less than critically damped, a train of sonic or supersonic waves are emitted, while if the transmitter is more than critically damped, only one sharp impulse is emitted. After a short interval depending upon the velocity of the sonic or supersonic wave through the particular medium and the distance between the microphone 1 and the transmitter 4, the waves reach the microphone 1. An alternating electromotive force is produced which is amplified by the amplifier AMP and after passing through the transformer 2, the first positive half cycle of the amplified wave having sufficient amplitude operates the device 3 to cause the potential of the control electrode of device 3 to become less negative than its critical negative potential. The cathode-anode impedance of the device suddenly drops to a low value. The condenser 8 having accumulated a charge from the battery 7 through the resistance 14 discharges and a current passes through the primary of transformer 10 and the transmitter 4. As a result, the transmitter again emits sonic or supersonic waves and the frequency meter is actuated. The anode current subsequently drops and the normal negative bias on the grid of the device is sufficient to render the anode-cathode path an effective open circuit.

The above described operation is repeated on the reception by the microphone 1 of the sonic waves emitted by the transmitter 4. The frequency meter 9 indicates the number of times that the waves are emitted during a predetermined period of time. This meter 9 may be calibrated in distance. Other means may be employed for this purpose.

If the distance between a point in one molecular medium and the bounding surface of another medium is desired the microphone 1 and the transmitter 4 are located at the point. Interference due to the direct transmission of waves from the transmitter 4 to microphone 1 is prevented by placing the transmitter 4 and microphone 1 sufficiently close together so that the signal due to the direct transmission reaches device 3 while still broken down and incapable of responding. The sonic or supersonic waves emitted from the transmitter 4 are reflected by the bounding surface and the reflected waves returned to the microphone 1 for the emission of another wave or train of waves by the transmitter 4. The fact that the waves twice traverse the distance to be measured is considered in calculating the distance or in calibrating the frequency meter. The manner in which the waves travel from the transmitter 4 to the bounding surface, are reflected by the surface, and are impressed on the microphone 1 is indicated in Fig. 1 by the dotted lines.

Fig. 2 shows a schematic of the system embodying this invention in which the sound is emitted automatically at predetermined intervals if no reflected waves are received. With the self-starting feature, no manual starting of the system for altitude determination is required. This feature is particularly advantageous for use on airplanes. For example, an airplane in flight often travels at altitudes varying from 2500 feet to less than 100 feet within a short period of time. Usually knowledge of flying at low altitudes is of paramount concern to an airplane pilot. If, then, the intensity of a sonic or supersonic wave after reflection is not sufficient to actuate the source to emit another wave or if the system is constructed and maintained for low altitude determination, the system without this feature would become inoperative at the higher altitudes and remain inoperative subsequently at lower altitudes. With the self-starting feature, however, the oscillator emits a sonic or supersonic wave at periodic intervals even if no reflected wave is received. As a result low altitudes are ascertained without any manual actuation, notwithstanding the varying altitudes through which an airplane has previously passed. In Fig. 2, the numeral 20 represents an instrumentality, such as a moving coil type loud-speaker with an exponential horn, which serves to receive and transmit the sonic or supersonic waves. A hybrid coil 21 provides a means by which the transmitting and receiving circuit of the system are connected to the instrumentality 20. A network N connected to the hybrid coil 21 balances in a well-known manner the impedance of the instrumentality 20.

The receiving portion of the circuit passes from the hybrid coil to the band-pass filter B. P. F. through the amplifier AMP to the transformer 22. The filter B. P. F. passes a narrow band of frequencies including those produced by the sonic or supersonic waves employed in the system. From the secondary of transformer 22 the electromotive force generated is impressed upon the grid of space discharge device 23.

Space discharge device 23 has characteristics similar to those of device 3 shown in Fig. 1. The input circuit of the device 23 comprises the secondary of transformer 22, one terminal of which is connected to the control electrode of the device and the other to ground through the resistance 30.

The anode of device 23 is supplied with current by the battery 26. The negative terminal of the battery 26 is connected to ground. Between ground and the cathode of device 23 two resistances 31 and 27 are connected in series. Resistance 27 is considerably larger than resistance 31. A condenser 28 is connected between the common connecting point of resistances 27 and 31 and the anode of device 23. A switch 39 serves to remove condenser 28 from the circuit when desired. A voltage limiting means comprising the space discharge device 29 is bridged across the resistance 27. An electromagnetic relay 24 and condenser 25 in series are connected between the anode and cathode of device 23.

A measuring instrument M records directly or indirectly the distance to be measured. The system by which the measurement is determined comprises an armature 33 associated with the electro-magnetic relay 24 and connected to ground through the condenser 34. The condenser 34 is charged by the engagement of the armature 33 with its left-hand or break contact through the resistance 35 connected to the positive terminal of battery 26. The condenser discharges by the engagement of the armature 33 with its make contact through the resistances 36 and 37 to the meter M and thence to ground. A condenser 38 is bridged across the resistance 37 and the meter M. The resistance 37 and condenser 38 form a filter which smooths out the pulsations of the current passing through M.

The current flowing through the meter M is directly proportional to the voltage of the battery 26, the capacitance of condenser 34 and the number of times that the condenser 34 is discharged per second. The meter M and the capacitance of condenser 34 are selected with respect to the voltage of battery 26 so that a full scale meter reading is obtained for the maximum rate of operation of the relay 24. This maximum rate corresponds to the minimum altitude to be measured.

A conventional reverse feed-back oscillator 40 comprising a space discharge device 42 is connected to the instrumentality 20 by means of a transformer 41 through the hybrid coil 21. This type of oscillator is illustrated in Fig. 11 of an article entitled "Constant frequency oscillators" by F. B. Llewellyn published in the Proceedings of the Institute of Radio Engineers for December, 1931, Vol. 19, pages 2063 to 2094. The voltage drop across a resistance 43 in the input circuit of space discharge device 42 caused by the flow of current through the resistance 43 and a resistance 44 in the output circuit of the device 42 and in series with resistance 43 affords sufficient bias on the control electrode to prevent any current flow in the output circuit of the device. One of the terminals of resistance 43 is connected to the armature 32 of electromagnetic device 24, while the other terminal of the resistance 43 is connected to the make contact associated with that armature. When the resistance 43 is short-circuited as a result of the engagement of the armature 32 and its make contact, the bias on the control electrode of device 42 is dropped to zero. Oscillations are produced in the circuit and continue until the armature 32 is disengaged from its make contact.

Condenser 28 has a capacitance considerably greater than that of condenser 25. A value for condenser 28 of approximately ten times that of condenser 25 has been found satisfactory. Condenser 28 is connected in the circuit by means of the key 39 when relatively long distances are to be determined.

The transmitting and receiving instrumentality 20 is located in the molecular medium at the point from which the distance to the bounding surface of the other medium is to be measured. For determining the height of an airplane above ground the instrumentality 20 is placed on the underside of the airplane.

Assuming that the measurement of relatively long distances is desired, switch 39 is closed thus placing condenser 28 in the circuit. The characteristic of the voltage limiting device 29 bridged across the resistance 27 is such that when a potential below a certain critical value exists across the resistance 27, that device is substantially in open circuit, while above that critical value it acts as an extremely low impedance. Accordingly, when the apparatus is started, the condenser 28 is initially charged rapidly from the battery 26, the major portion of the current passing through the voltage limiting device 29. As the charge on the condenser 28 is increased, the rate of charging decreases and the potential across resistance 27 is reduced. The potential across the resistance 27 finally becomes sufficiently low to prevent any material current from passing through device 29. When this critical value of potential is attained substantially all the current passes through the resistance 27 and the rate of charging of the condenser 28 is markedly reduced.

Simultaneously with the charging of condenser 28, condenser 25 is charging from the battery 26, through the resistances 27 and 31. The current passing through electromagnetic relay 24 due to the charging of condenser 25 is insufficient to result in the engagement of armatures 32 and 33 with their respective make contacts. The potential drops across resistances 27 and 31 due to the charging of the condenser 25 are relatively small since the capacitance of condenser 25 is considerably less than that of condenser 28. Inasmuch as the rate of charging of condenser 25 decreases with time when device 29 becomes effectively an open circuit, the potentials across resistance 27 due to the charging of condensers 28 and 25 and that across resistance 31 due to the charging of condenser 25 are relatively low.

The potential of the cathode of device 23 is determined by the series potential drop of the resistances 27 and 31 above ground, while the control electrode of the device 23 is normally maintained at ground potential through resistance 30 and the secondary of transformer 22. When the potential of the control electrode of device 23 with respect to the cathode becomes less negative than a certain critical value, the anode-cathode impedance of the device becomes extremely low and remains at that low value until the anode voltage has fallen to a value insufficient to maintain the current through the device. Since the control electrode is relatively negative to the cathode during the early period of charging of condensers 25 and 28, the cathode-anode impedance is an open circuit. When the cathode potential drops, due to the decrease in current flowing through resistances 27 and 31 during the latter part of the charging of condensers 25 and 28, the potential of the control electrode becomes relatively less negative and the device 23 breaks down causing the discharge of condenser 25 through the anode-cathode path of device 23 and electromagnetic relay 24 in series. Armature 32 momentarily engages its make contact and the normal negative bias is removed from the oscillator permitting oscillations to occur. The oscillations are transmitted through the hybrid coil 21 to the instrumentality 20. Sonic or supersonic waves are then emitted from the instrumentality 20.

The energization of electromagnetic relay 24 also results in the engagement of armature 33 with its make contact. When the armature 33 is in contact with its break contact, the condenser 34 is charged by battery 26 through resistance 35. The engagement of armature 33 with its make contact discharges the condenser through resistances 36 and 37 and meter M. The meter M may be designed to indicate the frequency at which the condenser 34 is discharged through the meter, or calibrated to show the distance being measured.

The passage of current from anode to cathode of device 23 and through the winding of electromagnetic relay 24 results in the discharge of condenser 25. This discharge reduces the anode-cathode voltage sufficiently so that the control electrode regains control and the anode-cathode circuit becomes effectively an open circuit. Immediately after discharge, condenser 25 starts to recharge through resistance 31. Since resistance 27 is relatively large, the major portion of the current for charging condenser 25 is supplied from condenser 28. This recharging of condenser 25 reduces the voltage of condenser 28 by an amount approximately inversely proportional to the ratio of the capacitance of the two condensers. Condenser 28 begins to recharge through resistance 27. The potential of the control electrode of device 23 is negative with respect to the cathode of the device by the amount of the potential drop existing across resistances 27 and 31, due to the recharging current flowing through them. The bias due to the potential drop of resistance 31 exists only momentarily while condenser 25 is recharging. The potential drop across resistance 27 due to the recharging of condenser 28 is greater than the critical value of the potential of the control electrode of device 23 with respect to the cathode. It gradually decreases until it reaches the critical value of the control electrode after a period slightly greater than that required for the sonic or supersonic waves to travel from the instrumentality 20 and return for the maximum distance to be measured. This voltage across resistance 27 is not sufficient to prevent the actuation of device 23 by the reception of signals through the transformer 22.

The sonic or supersonic waves pass through the molecular medium and are reflected by the bounding surface of another medium, as for example, the surface of the earth. The reflected waves are impressed on the instrumentality 20. An electromotive force is generated in the hybrid coil 21. A current passes through the receiving circuit of the system through the filter B. P. F. It is amplified by the amplifier AMP. The amplified current passes through the transformer 22 to the device 23. As a result, the potential of the control electrode of device 23 becomes less negative than its critical value. The cathode-anode impedance becomes extremely low and the condenser 25 discharges through the electromagnetic relay 24. The normal negative bias is removed from the oscillator by the engagement of armature 32 with its make contact. Oscillations are generated by the oscillator and pass through the hybrid coil 21 to the instrumentality 20. Sonic or supersonic waves are again emitted.

The engagement of armature 33 with its make contact results in the discharge of condenser 34 through the meter M. Immediately after condenser 25 discharges, it starts to charge in a manner similar to that described above. Accordingly, sonic or supersonic waves are again emitted and the operation repeated upon the reception of the reflected sonic or supersonic waves or the passage of a predetermined interval corresponding to a distance slightly greater than that to be measured.

If the interval between discharges of condenser 25 is insufficient for condenser 28 to regain its full charge after recharging the condenser 25, the potential drop across resistance 27 gradually increases to a value great enough to render the device 23 due to the consequential negative bias of its control electrode, unresponsive to a signal impressed on the control electrode through the transformer 22. However, the voltage limiting device 29 prevents the potential of the control electrode of device 23 from ever exceeding the breakdown voltage of device 29. Should the breakdown voltage of the device 29 be exceeded, the condenser 28 is recharged rapidly through the voltage limiting device 29, thereby preventing the potential across resistance 27 from exceeding this breakdown value. When the potential across resistance 27 falls to a low value, the device 29 ceases to conduct until the breakdown voltage is again exceeded.

The number of times that the sonic or supersonic wave is emitted during a predetermined interval is indicated on the meter M. The distance is calculated or the meter is calibrated to indicate directly the distance since the velocity of the wave through the homogeneous medium is usually known.

The values of resistances 27 and 31 and condensers 28 and 25 are such that sonic or supersonic waves are emitted at periodic intervals even if no reflection waves are received by the instrumentality 20. Since the potential of the control electrode with respect to the cathode of device 23 depends upon the potential across resistances 27 and 31 when the potential across these resistances falls below the critical value of potential of the control electrode, the cathode-anode impedance of device 23 drops to a low value and sonic or supersonic waves are emitted. The rate of charge of condensers 28 diminishes with time with a resulting reduction of the potential drop across resistance 27. Accordingly, the interval is determined largely by the values of condenser 28, the resistance element 27, the terminal voltage of battery 26 and the potential at which the voltage limiting device 29 ceases to conduct current across resistance 27. This interval is chosen by the adjustment of the values of these parts of the system so that it corresponds to slightly greater than the maximum distance to be measured.

The values of parts of the system which are satisfactory to measure a maximum distance of about 500 feet through air to ground are as follows: Battery 26—200 volts, resistance 27—1 megohm, resistance 31—100,000 ohms, condenser 28—4 microfarads, condenser 25—.1 microfarad. The voltage limiting device breaks down at a potential of approximately 20 volts and with a plate voltage of 200 volts. The critical value of the potential of the control electrode of the particular device 23 employed is approximately —5 volts.

The value of resistance 35 is 4,000 ohms, resistance 37—20,000 ohms, resistance 36—4,000 ohms, condenser 34—.1 microfarad, and condenser 38—4 microfarads. The meter M employed is a direct current milliammeter with a full scale reading of 2 milliamperes.

When the determination of a distance between 2 and 100 feet is desired, the condenser 28 is preferably removed from the circuit by the key 39. The removal of condenser 28 results in a shortening of the period between the automatic emission of the sonic or supersonic waves by the instrumentality 20. Starting with the condition of condenser 25 as initially discharged, it immediately starts to charge through resistances 27 and 31 in series. Since resistance 27 is large compared to resistance 31, the breakdown voltage of device 29 is exceeded and the condenser 25 is effectively charged through resistance 31 and device 29 until the voltage drop across resistance 27 falls below the value required to maintain current through device 29. After the device 29 ceases to conduct, the condenser 25 completes its charge through resistances 31 and 27 at a relatively low rate. During this part of the charge cycle, the bias on the control electrode of device 23 is greater than the critical value, but not too great to prevent the reception of a signal through transformer 22. If no signal is impressed upon the control electrode of device 23, the bias potential across resistances 31 and 27 gradually drops below the critical value and device 23 breaks down to emit sonic or supersonic waves. The operation of the system upon the reception of the reflected sonic or supersonic waves is the same as when condenser 28 is in the circuit except that the condenser 25 is recharged directly from the battery 26 as described immediately above.

While preferred embodiments of this invention have been shown and described, various modifications therein may be made, the scope of the invention being defined by the appended claims.

What is claimed is:
1. In combination, a source of longitudinal waves, means responsive to said waves after reflection on a surface for actuating said source and means for disabling said first stated means for a period sufficient to prevent the actuation of said source by the direct emission of said longitudinal waves.

2. A system for measuring distances comprising a source of longitudinal waves, actuating means, unresponsive to longitudinal waves for a predetermined period which is slightly greater than the period of reception of direct waves emitted by said source, for rendering said source operative at intervals determined by the time required for said waves to travel to a reflecting surface and return to said actuating means, and means for indicating the rate of operation of said source.

3. A system for determining distances comprising a device for producing sound waves, means, unresponsive to sound waves for a predetermined period which is slightly greater than the period of reception of direct waves produced by said source and responsive to said waves after being reflected by a surface, for actuating said device, and means for indicating the rate of actuation of said device.

4. A system for determining distances comprising a device for producing waves, means responsive to said waves after reflection on a surface for actuating said device, means for initiating periodically the production of said waves in the absence of the reception of reflected waves by said first stated means, and means for indicating the rate of actuation of said device.

5. A system for measuring distances comprising a device for producing a train of longitudinal waves, means, unresponsive to a train of longitudinal waves for a predetermined period which is slightly greater than the period of reception of direct waves produced by said device and responsive to said train of waves after passage through a homogeneous medium, for actuating said device, and means for determining the rate of actuation of said device.

6. A system for measuring distances comprising a device for the periodic emission at predetermined intervals of a train of longitudinal waves, means for varying said interval, receiving said waves after reflection on a surface, means unresponsive to waves received directly from said device and responsive to the reception of said reflected train of waves for actuating the emission of another train of waves and simultaneously discontinuing said periodic emission of waves, and means for determining the rate of emission of said train of waves, said device automatically resuming the periodic emission of wave trains when further reflected waves are not received.

7. In combination, a source of longitudinal waves, means responsive to said waves after passing through a molecular medium for actuating said source, and means for actuating said source at predetermined intervals in the absence of the reception of said longitudinal waves by said first stated means within said predetermined interval.

8. An altimeter comprising a microphone, a transmitter unresponsive to the direct emission of a sound wave, means associated with said microphone and said transmitter and responsive to a sound wave after reflection on a surface impressed on said microphone for producing an emission of a sound wave by said transmitter, means for indicating the rate that said transmitter is actuated, means for periodically initiating the production of a sound wave in the absence of the impression of a reflected sound wave on said microphone, said periodic waves being initiated at predetermined intervals, and means for varying said intervals.

9. An altimeter comprising an instrumentality for receiving and transmitting sound waves, an oscillator associated with said instrumentality for actuating said instrumentality to produce sound waves, means associated with said instrumentality and responsive to the reception of sound waves by said instrumentality for momentarily operating said oscillator, means for actuating said oscillator at predetermined intervals in the absence of the reception of sound waves by said instrumentality, and means for indicating the rate of actuation of said oscillator.

10. In combination, a source of longitudinal wave, means responsive to said longitudinal wave emitted by said source for actuating said source to emit another longitudinal wave, means for actuating said source to emit a longitudinal wave in the absence of the reception of a longitudinal wave by said first stated means within a predetermined period of time and means to vary said predetermined period.

11. In combination, a source of longitudinal waves, actuating means responsive to waves emitted by said source after reflection on a surface for actuating said source, and means responsive to the actuation of said source for disabling said actuating means for a predetermined period of time which is slightly greater than the period of reception of direct waves emitted by said source.

12. A method of measuring the distance between a point and a surface comprising emitting a wave from a source located at said point, preventing the emission of another wave from said source for a period which is slightly greater than the period of direct reception of the wave at said point, receiving said wave emitted by said source after reflection on said surface, transmitting by operation of the receiving means upon the transmitting means, another wave upon the reception of said reflected wave and indicating the rate of emission of said waves by said source within a predetermined period of time.

RUSSELL C. NEWHOUSE.
WILLIAM C. TINUS.